(12) United States Patent

Ohanian et al.

(10) Patent No.: US 12,635,748 B2

(45) Date of Patent: May 26, 2026

(54) DIGGING GLOVE

(71) Applicant: Ara Ohanian, Doraville, GA (US)

(72) Inventors: Ara Ohanian, Doravill, GA (US); Alice Sevan Ohanian, Montreal (CA)

(73) Assignee: Ara Ohanian, Doraville, GA (US)

( * ) Notice: Subject to any disclaimer, the term of this patent is extended or adjusted under 35 U.S.C. 154(b) by 0 days.

(21) Appl. No.: 15/447,141

(22) Filed: Mar. 2, 2017

(65) Prior Publication Data

US 2018/0249774 A1 Sep. 6, 2018

(51) Int. Cl.

| | |
|---|---|
| *A41D 19/015* | (2006.01) |
| *A01B 1/00* | (2006.01) |
| *A41D 13/08* | (2006.01) |
| *A41D 19/00* | (2006.01) |

(52) U.S. Cl.

CPC .......... *A41D 19/01594* (2013.01); *A01B 1/00* (2013.01); *A41D 13/087* (2013.01); *A41D 19/001* (2013.01); *A41D 19/015* (2013.01); *A41D 19/01547* (2013.01)

(58) Field of Classification Search

CPC ........ A41D 19/01594; A41D 19/01547; A41D 13/087; A41D 19/001; A41D 19/015; A41D 2400/80; A01B 1/00; A46B 5/04; A47L 13/18

See application file for complete search history.

(56) References Cited

U.S. PATENT DOCUMENTS

| | | | | | |
|---|---|---|---|---|---|
| 137,771 | A | * | 4/1873 | Gash et al. ............. | A47J 17/02 172/370 |
| 275,463 | A | * | 4/1883 | Burnes .................. | B26B 27/007 172/370 |

| | | | | | |
|---|---|---|---|---|---|
| 622,386 | A | * | 4/1899 | Peery ............. | A61B 17/320708 2/21 |
| 1,055,838 | A | * | 3/1913 | Torrance .......... | A41D 19/01547 172/370 |
| 2,056,555 | A | * | 10/1936 | Auster ............... | A41D 19/0062 2/163 |

(Continued)

FOREIGN PATENT DOCUMENTS

JP 2000239910 A * 9/2000

OTHER PUBLICATIONS

"Badger Garden Gloves: The Gardening Tool That Fits Like A Glove!", Web page <http://www.honeybadgergloves.com/>, 2 pages, Mar. 1, 2014, Retrieved from Internet Archive Wayback Machine <https://web.archive.org/web/20140301174711/http://www.honeybadgergloves.com> on May 16, 2017.*

(Continued)

*Primary Examiner* — Alicia Torres

(74) *Attorney, Agent, or Firm* — Fish & Richardson P.C.

(57) ABSTRACT

A digging glove may include a glove and a digging claw member secured to at least one finger of the glove. The digging claw member may include a claw body and at least one claw tip profile extending from the claw body. The at least one claw tip profile may include an inner profile defining a main chamber, and an isolation chamber. The inner profile includes an extension member extending inwardly within the claw body separating the main chamber from the isolation chamber. The isolation chamber may extend at least within an inner portion of the at least one claw tip profile.

20 Claims, 23 Drawing Sheets

(56) References Cited

U.S. PATENT DOCUMENTS

| | | | | |
|---|---|---|---|---|
| 2,409,101 | A | * | 10/1946 | Brittingham ............. A01B 1/00 |
| | | | | 2/21 |
| 2,717,546 | A | * | 9/1955 | Ryden ............. A41D 19/01547 |
| | | | | 172/370 |
| 2,717,799 | A | * | 9/1955 | Jones ................... A41D 13/087 |
| | | | | 2/21 |
| 2,954,832 | A | * | 10/1960 | Pirone ...................... A01G 1/12 |
| | | | | 172/370 |
| 3,404,409 | A | * | 10/1968 | Tillotson .......... A41D 19/01547 |
| | | | | 2/167 |
| 3,593,803 | A | * | 7/1971 | Ibach ........................ A01B 1/00 |
| | | | | 172/10 |
| 3,728,736 | A | * | 4/1973 | Pugh ................... A41D 13/087 |
| | | | | 2/21 |
| 3,896,807 | A | * | 7/1975 | Buchalter .............. A41D 13/11 |
| | | | | 2/901 |
| 3,927,595 | A | * | 12/1975 | Ferguson ............. A41D 13/087 |
| | | | | 84/322 |
| 3,985,383 | A | * | 10/1976 | Yonkers ................... B42D 9/04 |
| | | | | 2/21 |
| 4,094,014 | A | * | 6/1978 | Schroeder ........ A41D 19/01505 |
| | | | | D29/117.1 |
| 4,127,222 | A | * | 11/1978 | Adams ................... D05B 91/04 |
| | | | | 2/21 |
| 4,149,601 | A | * | 4/1979 | Taylor ...................... A01B 1/06 |
| | | | | 172/370 |
| 4,474,246 | A | * | 10/1984 | Arroyo ................... A01B 1/00 |
| | | | | 172/370 |
| 4,536,890 | A | * | 8/1985 | Barnett .............. A41D 19/0062 |
| | | | | 2/164 |
| 4,694,843 | A | * | 9/1987 | Casenhiser ............ A45D 29/00 |
| | | | | 132/73 |
| 4,867,246 | A | * | 9/1989 | Kiger ............... A41D 19/01594 |
| | | | | 172/370 |
| 5,014,792 | A | * | 5/1991 | Gierloff ................... A01B 1/06 |
| | | | | 172/250 |
| 5,312,134 | A | | 5/1994 | Goode et al. |
| D373,225 | S | * | 8/1996 | Theroux ...................... D29/114 |
| D373,356 | S | * | 9/1996 | Boyd ........................... D14/133 |
| 6,128,778 | A | * | 10/2000 | Castagneri .......... A41D 13/087 |
| | | | | 2/161.1 |
| 6,409,059 | B1 | * | 6/2002 | Calvert ................ A41D 13/087 |
| | | | | 2/21 |
| D488,588 | S | * | 4/2004 | Murphy ....................... D29/114 |
| 6,726,068 | B2 | * | 4/2004 | Miller .................... D05B 91/04 |
| | | | | 223/101 |
| D513,827 | S | * | 1/2006 | Ward ............................ D2/619 |
| D517,278 | S | * | 3/2006 | Chernick ...................... D2/615 |
| D569,578 | S | * | 5/2008 | Yan ............................... D2/614 |
| 7,744,137 | B2 | * | 6/2010 | Mazyck ................... B42D 9/04 |
| | | | | 294/25 |
| D645,212 | S | * | 9/2011 | Gellis ............... A41D 19/0065 |
| | | | | D29/117.2 |
| 8,225,427 | B2 | | 7/2012 | Bevier |
| 8,381,313 | B2 | * | 2/2013 | Logan .................. A41D 13/087 |
| | | | | 2/21 |
| 8,856,966 | B2 | * | 10/2014 | Doty ...................... A61H 7/003 |
| | | | | 119/600 |
| D749,792 | S | * | 2/2016 | Visokey ................... D29/117.1 |
| D831,896 | S | * | 10/2018 | Krahe ......................... D29/114 |
| 10,993,488 | B1 | * | 5/2021 | Chou ........................ B32B 3/30 |

| | | | | |
|---|---|---|---|---|
| 11,000,083 | B2 | | 5/2021 | Visokey |
| 2004/0010217 | A1 | * | 1/2004 | Blette ................... A61F 13/105 |
| | | | | 602/54 |
| 2009/0139007 | A1 | * | 6/2009 | Bevier ................. A63B 71/148 |
| | | | | 2/161.1 |
| 2009/0139010 | A1 | * | 6/2009 | Bevier ................. A63B 71/148 |
| | | | | 2/161.8 |
| 2009/0210991 | A1 | | 8/2009 | Tutor |
| 2010/0192279 | A1 | | 8/2010 | Hunsicker |
| 2010/0192280 | A1 | * | 8/2010 | McClard ............... B44C 1/1712 |
| | | | | 428/172 |
| 2011/0030121 | A1 | * | 2/2011 | Smalls ............. A41D 19/01547 |
| | | | | 2/161.7 |
| 2011/0041235 | A1 | | 2/2011 | Harris |
| 2011/0252536 | A1 | * | 10/2011 | Hendon ........... A41D 19/01547 |
| | | | | 2/160 |
| 2012/0317954 | A1 | * | 12/2012 | Landicini, Jr. ........... A01D 7/00 |
| | | | | 56/400.01 |
| 2013/0019367 | A1 | * | 1/2013 | Lasci ............... A41D 19/01594 |
| | | | | 2/20 |
| 2013/0291281 | A1 | * | 11/2013 | Lee .................... A41D 19/0024 |
| | | | | 2/160 |
| 2014/0059737 | A1 | | 3/2014 | Husain |
| 2016/0007663 | A1 | * | 1/2016 | Price .................. A41D 19/0024 |
| | | | | 2/160 |
| 2016/0081404 | A1 | * | 3/2016 | Visokey ........... A41D 19/01594 |
| | | | | 2/161.6 |
| 2017/0055605 | A1 | * | 3/2017 | Block .............. A41D 19/01594 |
| 2017/0142931 | A1 | * | 5/2017 | Michaelson ........ B29C 45/1701 |

OTHER PUBLICATIONS

"Honey Badger Garden Gloves—with Claws?", Commonweeder Welcome To My Garden, 2 pages, Oct. 24, 2014, Retrieved from the Internet <http://www.commonweeder.com/honey-badger-garden-gloves-claws/> on May 10, 2017.*

"Product Review: Honey Badger Garden Glove", Home Garden Joy Keep Growing!, 3 pages, Oct. 23, 2014, Retrieved from the Internet <http://homegardenjoy.com/site/2014/10/product-review-honey-badger-garden-glove.html> on May 10, 2017.*

"Get your digs in with clawed garden gloves", Chicago Tribune, 3 pages, Aug. 7, 2014, Retrieved from the Internet <http://www.chicagotribune.com/lifestyles/home/> on May 10, 2017.*

"Badger Garden Gloves The Gardening Tool that fits like a Glove," Webpage <https://www.honeybadgergloves.com>, 8 pages, Sep. 7, 2015. Retrieved from Internet Archive Wayback Machine <https://web.archive.org/web/20150907170115/http://www.honeybadgergloves.com/> on Jul. 24, 2021. (Year: 2015).*

Screen capture from YouTube video clip entitled "Honey Badger—Digging Gloves for Gardening" 1 page, uploaded on Apr. 10, 2015 by user "Honey Badger Garden Gloves". Retrieved from Internet <https://www.youtube.com/watch?v=KpAgSp4yPT8> on Jul. 22, 2021. (Year: 2015).*

"The Honey Badger Garden Glove (Canceled) The Gardening Tool that Fits like a Glove!" Retrieved from Internet <https://www.kickstarter.com/projects/355280012/the-honey-badger-garden-glove/description>, 20 pages, retrieved on Nov. 3, 2021.

"Badger Garden Gloves, The Gardening Tool that Fits like a Glove, Product History," Retrieved from the Internet https://web.archive.org/web/20141010142628/http://www.honeybadgergloves.com/product-history/, 6 pages, retrieved on Nov. 3, 2021.

* cited by examiner

52

12

52

12

DIGGING GLOVE

TECHNICAL FIELD

The present disclosure generally relates to a digging tool, and more particularly relates to a glove equipped with a digging tool such as a claw or claw set. Additionally, the disclosure also relates to a separate claw or claw set.

BACKGROUND

Gardening gloves are well known. Some such gloves have reinforced areas around finger tips to reduce wear of the gloves and protect the fingers of a wearer. Some wearers would use gloved fingers in order to dig in soil such as for planting seeds, shrubs, etc. Depending upon the soil, it may prove difficult to dig with the gloved hand. Digging tools like spades, shovels and trowels are also known for assisting in digging, but they could be more convenient for use. For example, a constant requirement to lay down and pick up the digging tool is not as convenient for a gardener as it could be.

Accordingly, it is desirable to provide an improved digging tool that is effective for digging a greater variety of soil types and that is convenient to use. It is further desirable to provide a digging tool that is relatively inexpensive to manufacture and that is intuitive in use. Furthermore, other desirable features and characteristics of the present invention will become apparent from the subsequent detailed description and the appended claims, taken in conjunction with the accompanying drawings and the foregoing technical field and background.

SUMMARY

The present disclosure discloses a digging glove that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

A digging glove may include a glove and a digging claw member secured to at least one finger of the glove. The digging claw member may include a claw body and at least one claw tip profile extending from the claw body. The at least one claw tip profile may include an inner profile defining a main chamber, and an isolation chamber. The inner profile includes an extension member extending inwardly within the claw body separating the main chamber from the isolation chamber. The isolation chamber may extend at least within an inner portion of the at least one claw tip profile.

In one embodiment, the claw body may encase the finger of the glove and extend to adjacent a second knuckle of the finger of the glove from a tip of the glove.

In one embodiment, the claw tip profile may include at least one claw tip seamlessly extending only part way to a base of the finger of the glove. The claw tip may include an end to contact with a digging media. In one example, the claw tip may include any of a blunt end, a sharpened end, a concave end, a convex end, a jagged end, a rounded end, a flat end or a pointed end. In one another embodiment, the claw tip profile may include at least one of a curved inner profile and a curved outer profile at least at a claw tip thereof. In one example of such embodiment, the curved inner profile may subtend an arc of at least 40 degrees, at least 80 degrees, at least 120 degrees or at least 160 degrees. In another example, the curved inner profile may have an increasing or decreasing curvature toward a tip of the claw.

In one embodiment, the digging claw member may include the claw body in which the main chamber receives a human finger or the finger of the glove to be worn by the human finger, and the isolation chamber formed by the extension member extends on a tip side from the main chamber, wherein the isolation chamber defines a smaller cross-sectional profile than the main chamber.

In one embodiment, the extension member may include a curved surface at a tip side end forming a seat for pads of a human finger or the finger of the glove to be worn by the human finger, and the isolation chamber extends on the tip side from the curved surface.

In one embodiment, the main chamber may be sized to receive a human finger or the finger of the glove to be worn by the human finger and the extension member may be sized to receive a finger nail portion of the wearer, whereas the isolation chamber may be an isolated free space.

In one additional embodiment, the digging glove may include a moisturizing liner on an inner side of the glove, wherein the liner releases moisturizing agent after multiple uses of the glove and/or multiple washes.

In one additional embodiment, the digging glove may include at least one tactile enhancement feature, wherein the tactile enhancement feature comprises a tacky material projecting from an exterior surface of an underside of the claw body. In an example, the tactile enhancement feature includes tactile members arranged in a pattern in at least rows, columns, spots, or swirls pattern.

In one embodiment, the claw body may seamlessly be attached to the finger of the glove to fixedly secure the digging claw member to the finger of the glove. Whereas in another embodiment, the claw body may detachably be attached to the finger of the glove to removably secure the digging claw member to the finger of the glove. In an example, at least one detachable connection element may be provided to removably secure the claw body and the glove. Example of such detachable connection element may be Velcro, mechanical fasteners or magnets.

In one embodiment, the claw tip profile may include a removable a claw tip. In such embodiment, a tool extension may be provided to be removably attached to the claw tip profile, when the claw tip is detached from the claw tip profile.

In one embodiment, the digging glove may include a plurality of projections on the digging claw member in a form of thorns, teeth, spikes or fins.

In one another aspect, a digging claw member for receiving a human finger or a finger of a glove to be worn by the human finger is provided. The digging claw member may include a claw body and at least one claw tip profile extending from the claw body. The at least one claw tip profile may include an inner profile defining a main chamber, and an isolation chamber. The inner profile includes an extension member extending inwardly within the claw body separating the main chamber from the isolation chamber. The isolation chamber may extend at least within an inner portion of the at least one claw tip profile.

Additional features and advantages are realized through the techniques of the present disclosure. Other embodiments and aspects of the present disclosure are described in detail herein and are considered a part of the present disclosure. For a better understanding of the present disclosure with advantages and features, refer to the description and to the drawings

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

Like reference numerals refer to like parts throughout the description of several views of the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Figure 1:
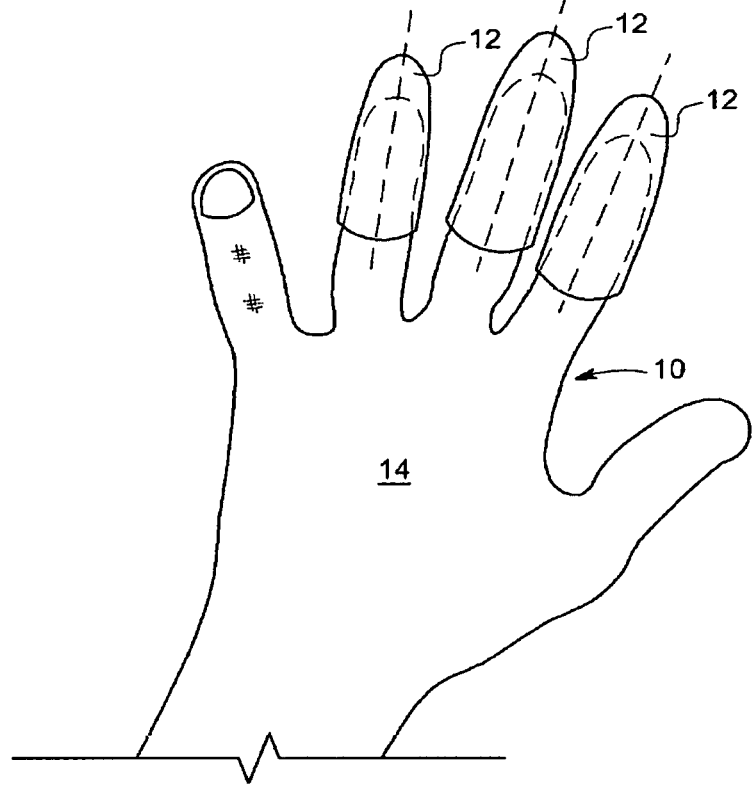
FIG. 1 is a top view illustrating a digging glove having claws secured to fingers of the glove, in accordance with various embodiments.

FIG. 1 illustrates a digging glove 10 including at least one digging claw member 12 and a glove 14. The digging claw member 12 may be encased around a finger of the underlying glove 14. The glove 14 includes glove finger and a glove thumb as is conventional. In various embodiments, the digging claw members 12 are included on each of at two, three (as exemplified in FIG. 1) or four of the glove fingers. In embodiments (not shown), a digging claw member 12 is included on the glove thumb.

The digging claw member 12 may be made of a hard material relative to the soft glove 14. In various embodiments, the digging claw member 12 may be made substantially of polymer material (plastic) and is injection moulded. In alternative embodiments, the claw 12 may be made substantially of metal. In various embodiments, the glove may be made substantially of fabric such as fabric including leather. The digging claw member 12 may be attached to the underlying glove 14 such as by way of adhesive, stitching etc.

Figure 2:
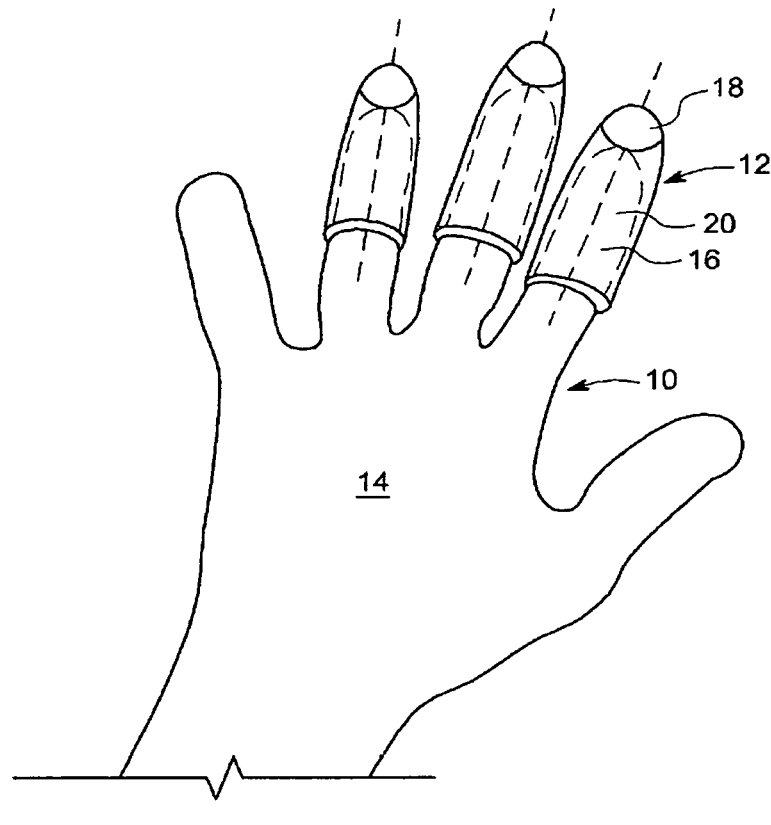
FIG. 2 is a view of the digging glove of FIG. 1, in accordance with various embodiments.
Figure 14:
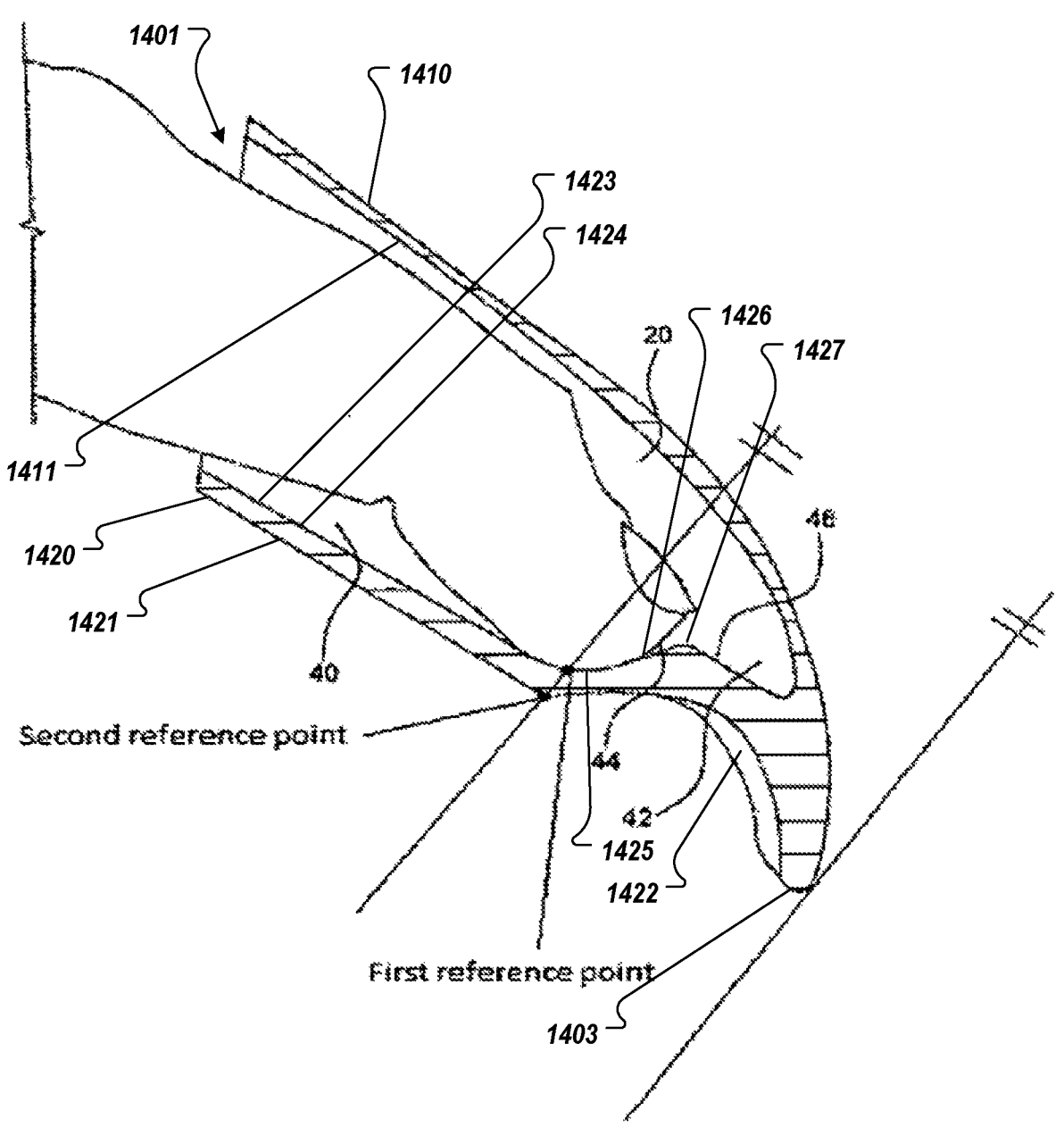
FIG. 14 is a cross-sectional view illustrating a claw having an isolation pocket, in accordance with various embodiments.

With additional reference to FIG. 2, the digging claw member 12 encases the glove finger. The digging claw member 12 includes a claw body 16 that encases the glove finger and is generally in the form of a sleeve. The claw body 16 having an inner profile 20 therein for receiving a linger of a wearer of the digging glove 10. The inner profile 20 of the claw body 20 is illustrated with a dashed line in FIGS. 1 and 2 and in further detail the inner profile is illustrated in FIG. 14 and will be herein in great details. The claw body 16 extends, in the illustrated embodiment, to adjacent (but not proximal of) a second knuckle of the finger of the glove 14 from a tip of the glove 14 so that the second knuckle of the finger is able to freely bend.

The digging claw member 12 includes a claw tip profile 18 disposed at the distal end of the claw body 16. In some embodiments, the claw tip profile 18 and the claw body 16 may be integrally formed. In embodiments to be described with reference to FIGS. 18 to 20, a removable claw tip profile 18 is envisaged. The claw tip profile 18 extends distally relative to the claw body 16. The claw tip profile 18 curves away from a back side of the digging glove 10 (worn adjacent a back side of the hand and shown in FIG. 1) and toward a palm side of the digging glove 10 (worn adjacent a palm side of the hand and shown in FIG. 2).

Figure 3:
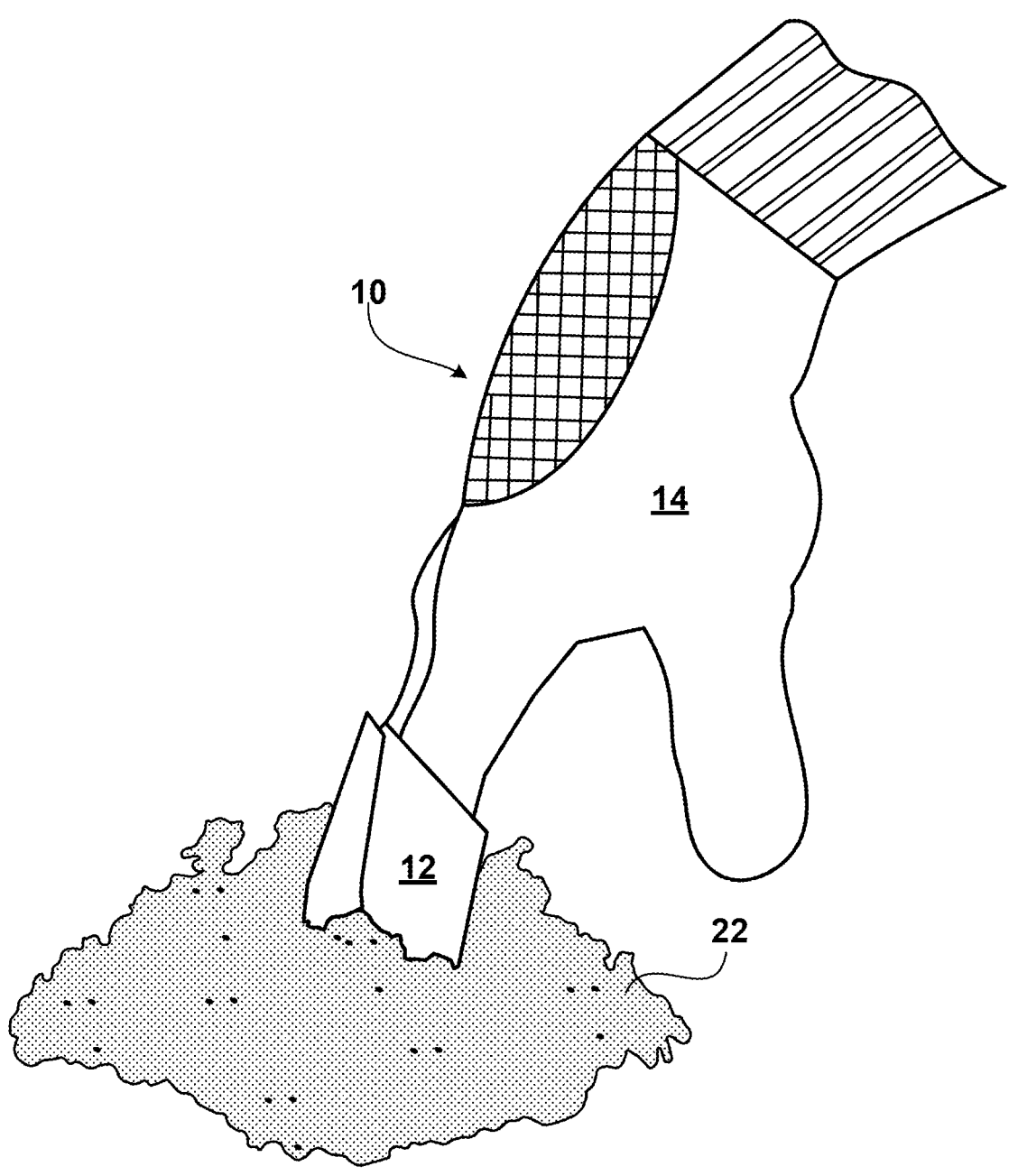
FIG. 3 is another view of the digging glove of FIG. 1 in use, in accordance with various embodiments.

FIG. 3 illustrates an exemplary use of the digging glove 10 as per various embodiments. The digging glove 10 is worn on the hand of the wearer. The digging glove 10 covers a back of the hand, a palm, each finger and the thumb. The digging glove 10 extends to a wrist of the wearer. The digging claw members 12 may be used to dig into media 22, such as soil, dirt and mud. The digging glove 10 may be particularly suited for gardening, however, without departing from the scope of the present disclosure, the digging glove 10 may be used for various other task, including but not limited to, deposited dirt cleaning purpose. The digging claw members 12 through the curved extension of the claw tip profiles 18 facilitate digging into the media 22 in a convenient and intuitive manner, whilst also protecting fingers of a wearer.

The foregoing discusses what could be considered a baseline digging glove 10 according to embodiments of the present disclosure. In the following, various additions, detail and modifications will be discussed. The modifications, additions and details of FIGS. 4 to 20 are applicable individually, severally or in combination.

Figure 4A:
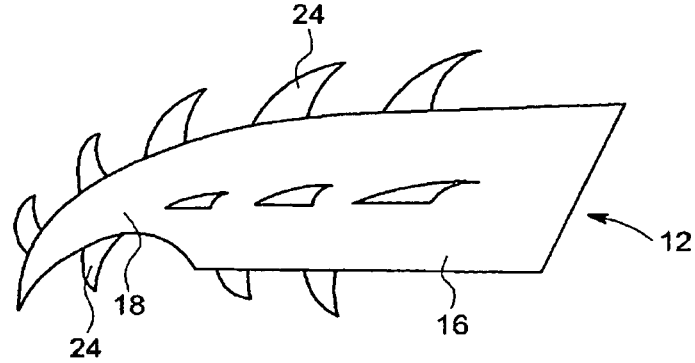
FIGS. 4a and 4b disclose alternative claws for the digging glove of FIG. 1, in accordance with various embodiments.
Figure 4B:
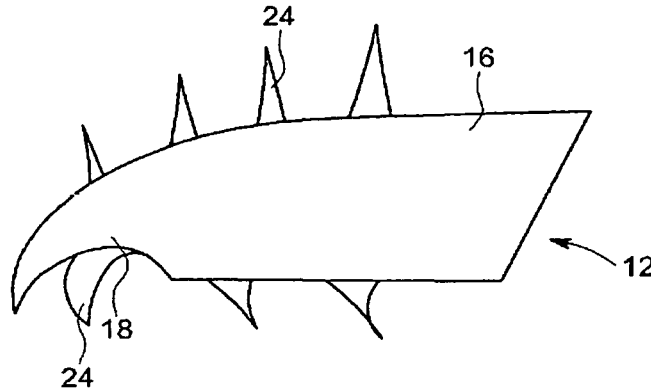

FIGS. 4a and 4b illustrate of projections 24 in the form of fins, teeth, spikes, thorns and/or secondary claws. The projections 24 extend radially from an outer surface of the digging claw member 12. In embodiments, the projections 24 extend from an outer surface of the claw body 16 and/or the claw tip profile 18. In embodiments, the projections 24 extend from a back side (opposing a palm side), a palm side and/or from medial sides (between palm and back sides) of the digging glove 10. The projections 24 can serve to ease digging into the media 22 and to break up the media 22.

Figure 5:
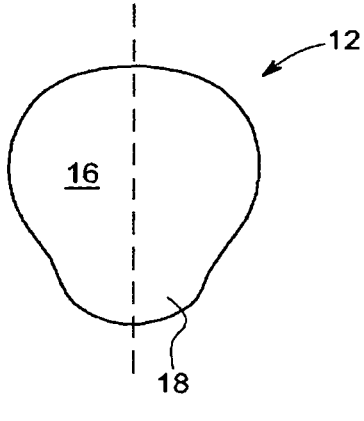
FIGS. 5, 6 and 7 illustrate front, back and profile views of a claw for the digging glove, in accordance with various embodiments.
Figure 6:
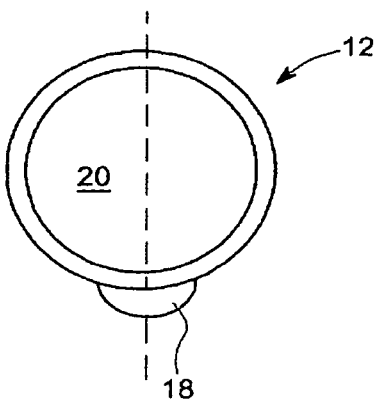
Figure 7:
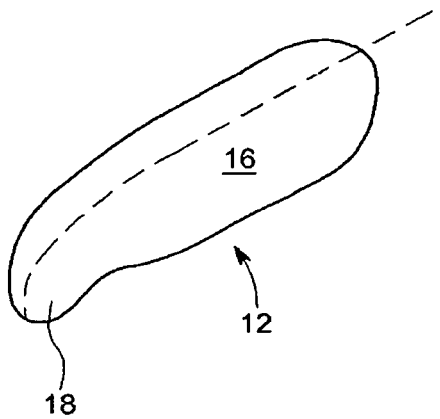

FIGS. 5, 6 and 7 illustrate views from a distal end, a proximal end and from a side of the digging claw member 12, respectively. From a proximal encl (FIG. 6), a proximal opening for the glove finger and the finger of the wearer can be seen allowing access into the inner profile 20 of the digging claw member 12. Further, the claw tip profile 18 can be seen to extend in the direction of a palm side of the digging glove 10 as a result of the curvature thereof. The claw tip profile 18 curves toward the palm of the digging glove 10 in the illustrated embodiment and has a curved distal end extending in a medial direction between medial sides of the digging claw member 12 between, e.g. halfway between, back and palm sides of the digging claw member 12. There are various other possibilities for the profile of the curved tip profile 18 of the digging claw member 12 as will be described below, particularly with respect to FIGS. 8a to 8l.

Figure 8A:
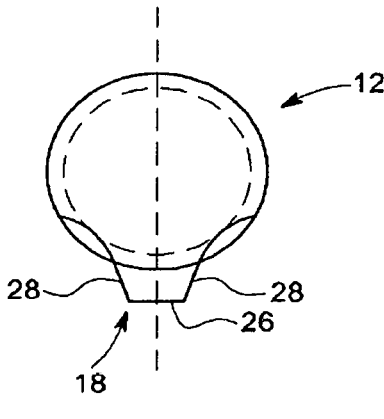
FIGS. 8a to 8l illustrate variations of a claw tip of the claw for the digging glove of FIG. 1 from front and side views, in accordance with various embodiments.
Figure 8B:
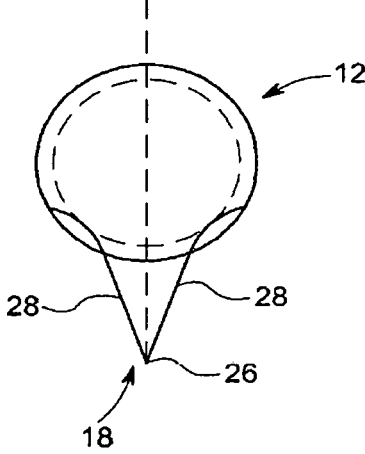
Figure 8C:
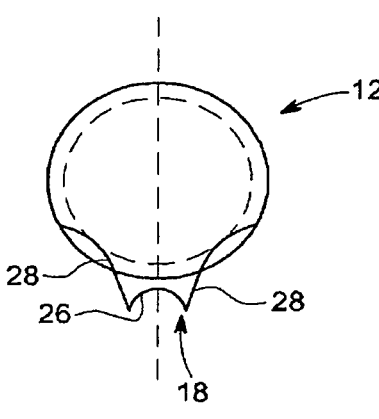
Figure 8D:
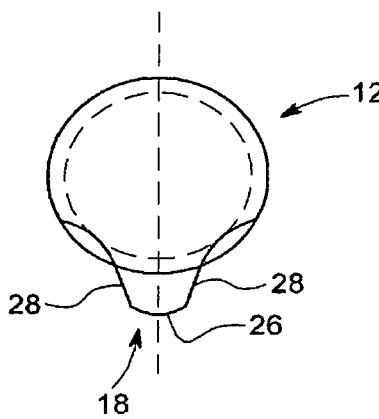
Figure 8E:
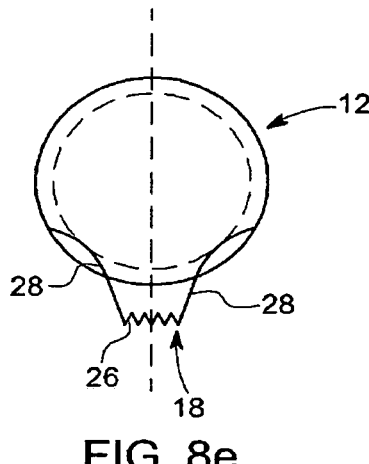
Figure 8F:
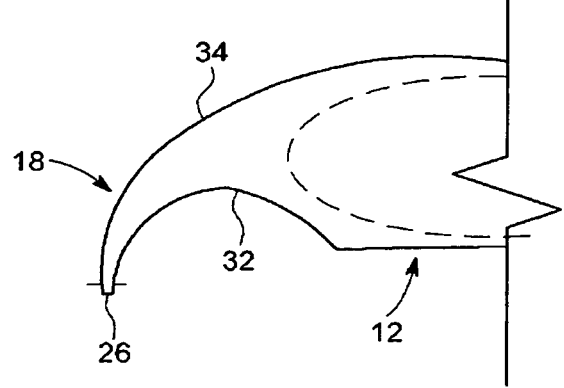
Figure 8G:
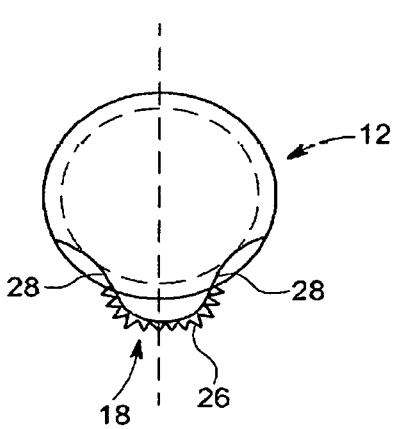
Figure 8G:
Figure 8H:
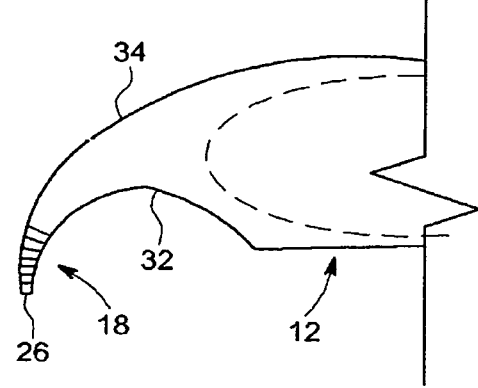
Figure 8I:
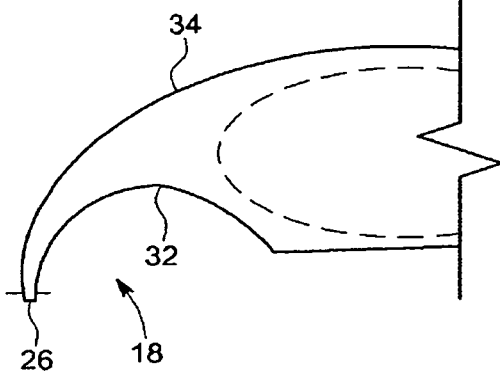
Figure 8J:
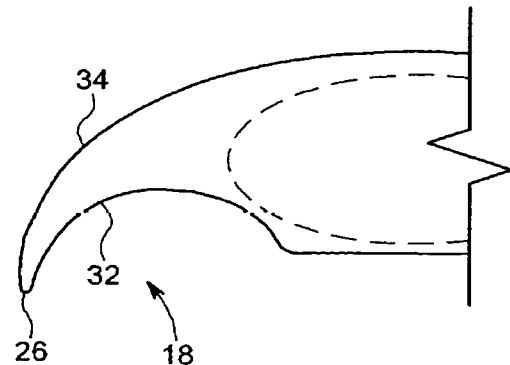
Figure 8K:
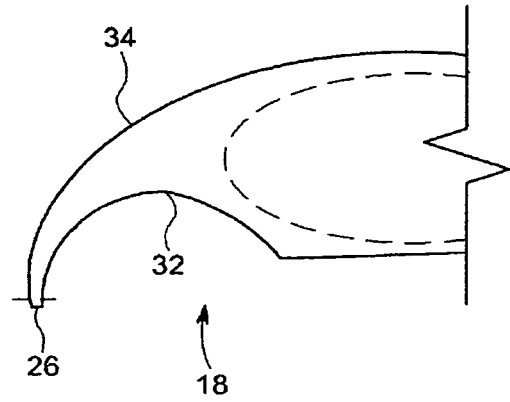
Figure 8L:
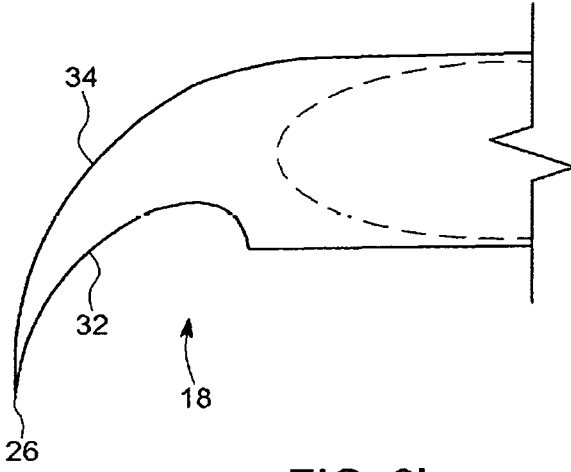

FIGS. 8a to 8l illustrate various views of the digging claw member 12 depicting the claw body 16 along with the claw tip profile 18. For example, FIG. 8a illustrates the claw tip profile 18. As shown, the claw tip profile 18 includes at least one claw tip 26 seamlessly extending, only part way to a base of the finger of the glove, from the claw body 16 of the digging claw member 12. The claw tip 26 having an end portion 28 to contact with a digging media. As shown in front view of the digging claw member 12 in FIG. 8a, the claw tip's 26 end portion 28 depicts a blunt end. Likewise, FIG. 8b-1, depicts various other examples of the claw tip 26 and its end portion 28, such as, a sharpened end, a concave end, a convex end, a jagged end, a rounded end, a flat end or a pointed end.

Figure 9A:
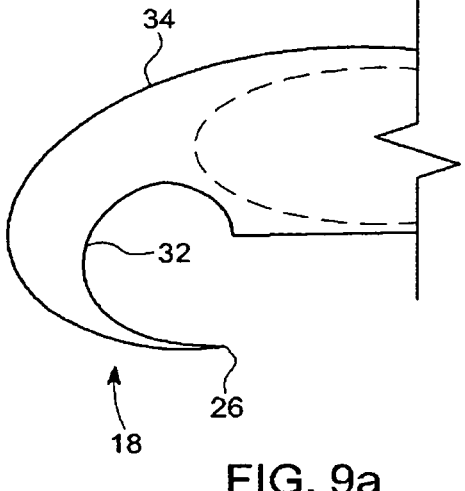
FIGS. 9a to 9f, 10a, 10b, 11a and 11b illustrate variations in inner claw profile for claw, in accordance with various embodiments.
Figure 9B:
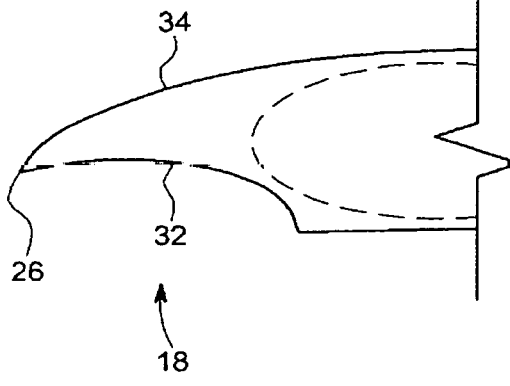
Figure 9C:
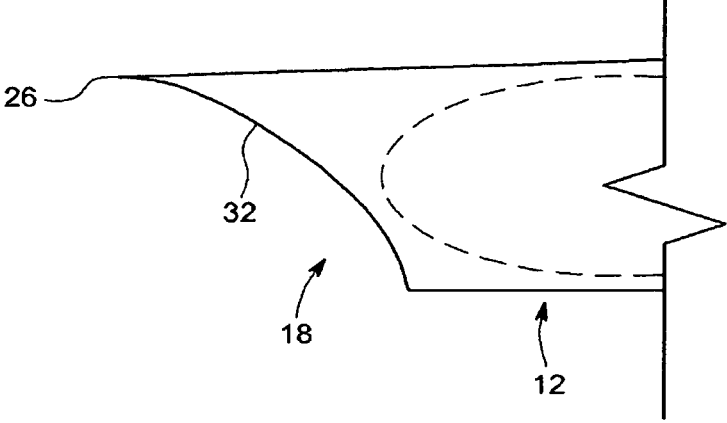
Figure 9D:
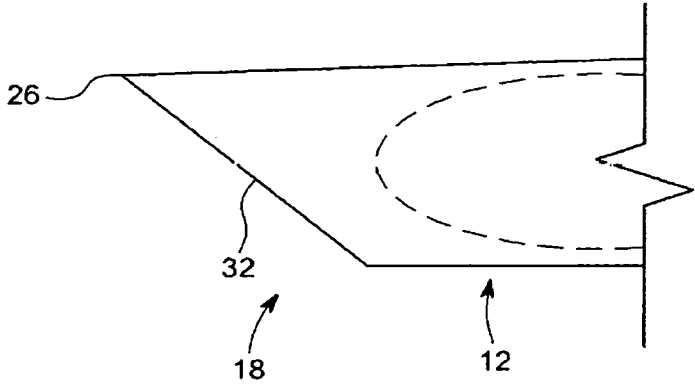
Figure 9E:
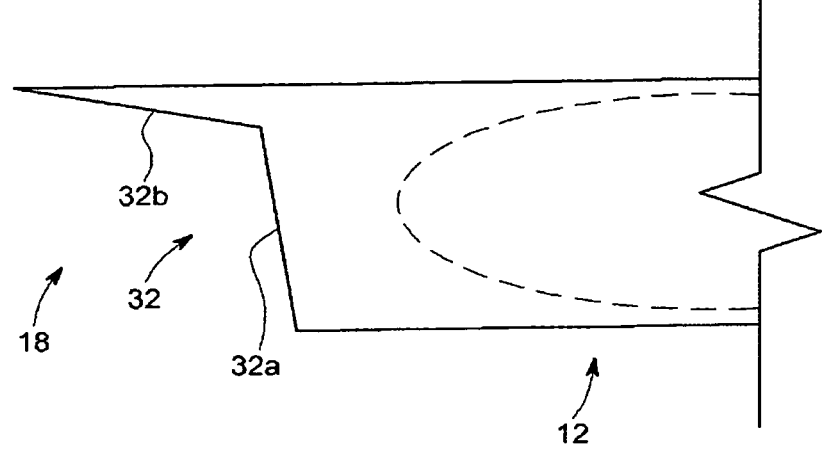
Figure 9F:
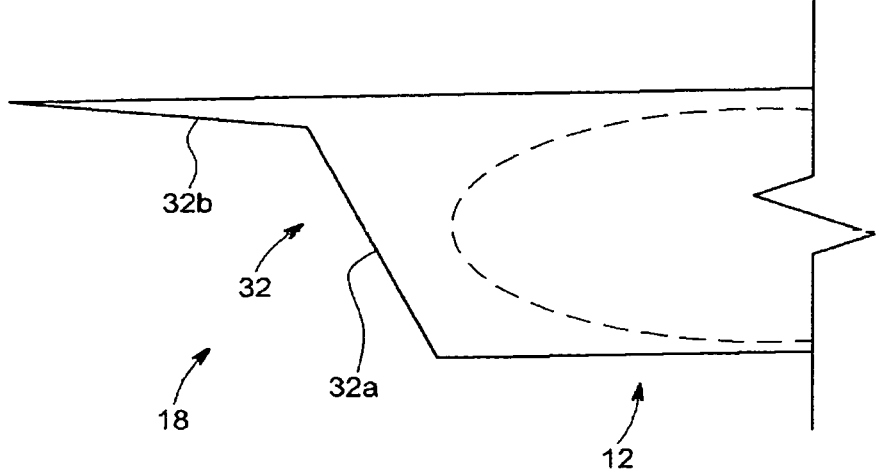
Figure 10A:
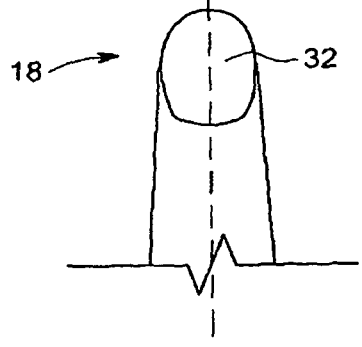
Figure 10B:
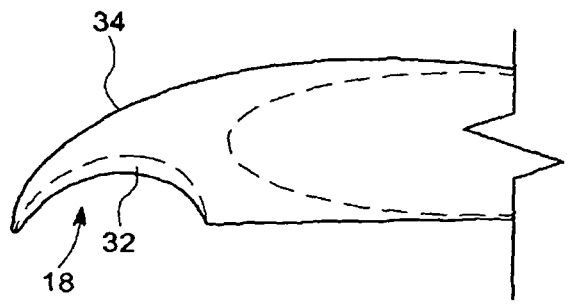
Figure 11A:
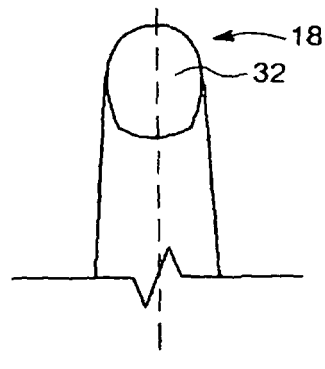
Figure 11B:
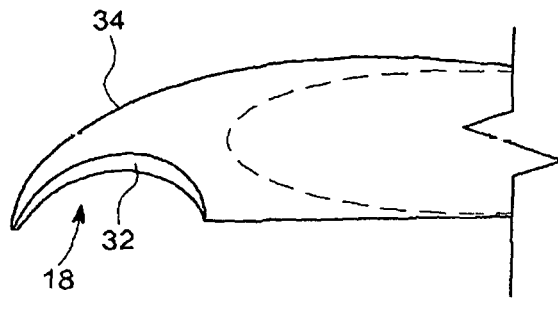
Figure 12:
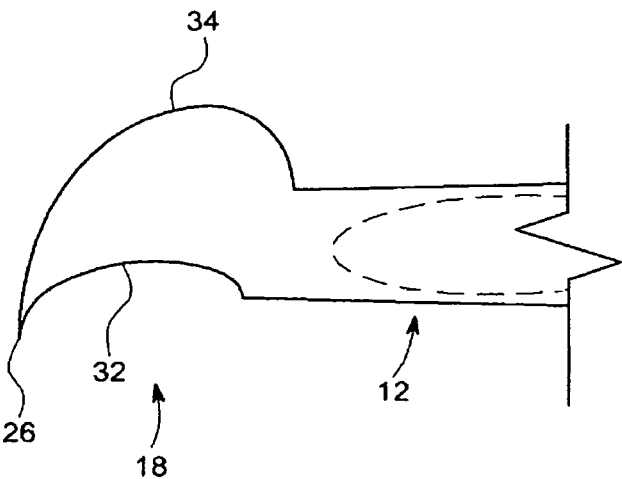
FIG. 12 illustrates an outer profile of a claw, in accordance with various embodiments.

In one embodiment, the claw tip profiles 18 include at least one of an inner profile 32 and an outer profile 34 of at least at the claw tip 26 thereof. As shown in FIGS. 8f, 8h, 8i to 8l; FIGS. 9a to 9f; and FIGS. 10a-12b there are illustrated various views of the digging claw member 12 depicting the inner profile 32 and the outer profile 34. For example, FIG. 9a illustrate a curved inner profile 32 and a curved outer profile 34 having extreme curves. FIG. 9b illustrate a curved inner profile 32 and a curved outer profile 34 having normal curves as are the case with the profiles as shown in FIGS. 8f, 8h, 8i to 8l. In one embodiment, the curved inner profile 32 subtends an arc of at least 40 degrees, at least 80 degrees, at least 120 degrees or at least 160 degrees as shown in FIGS. 9e to 9f that may be defined between 32a and 32b of the inner profile 32.

Figure 13A:
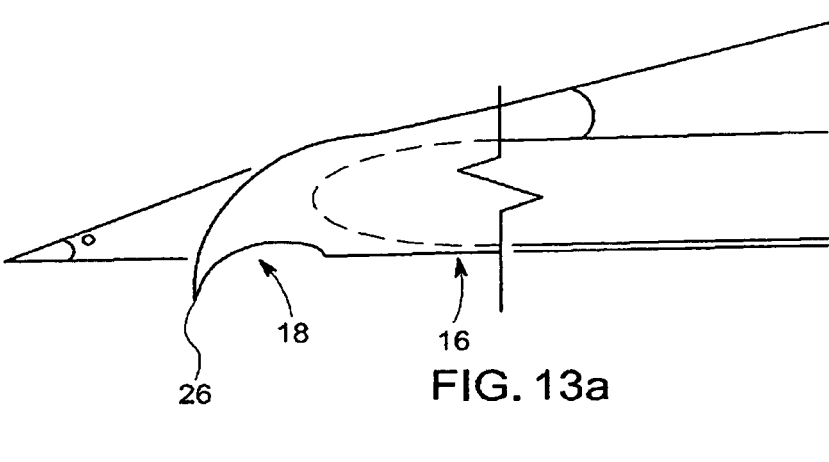
FIGS. 13a to 13j illustrate variation in form of a claw support of a claw, in accordance with various embodiments.
Figure 13B:
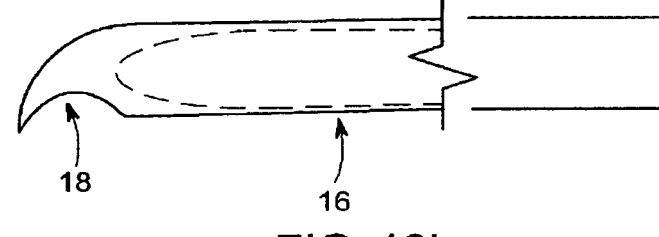
Figure 13C:
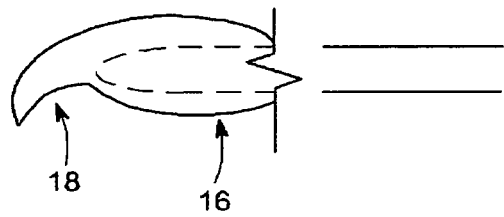
Figure 13D:
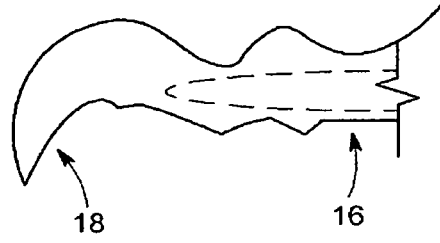
Figure 13E:
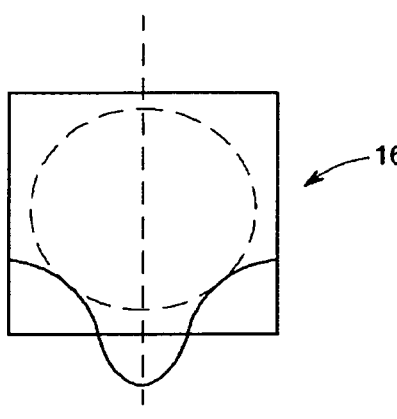
Figure 13F:
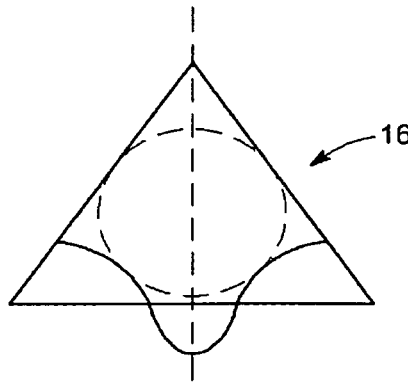
Figure 13G:
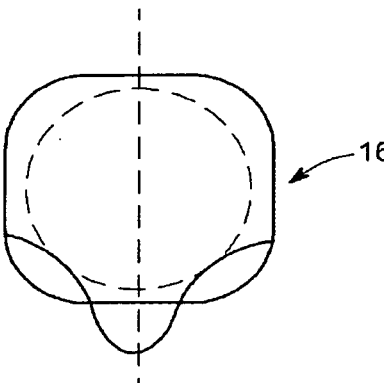
Figure 13H:
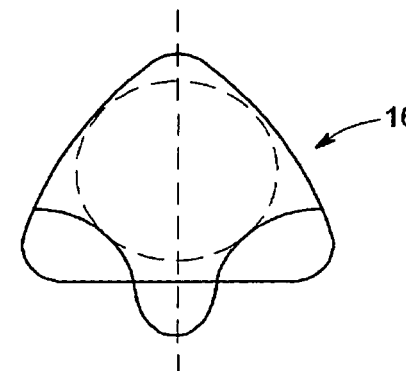
Figure 13I:
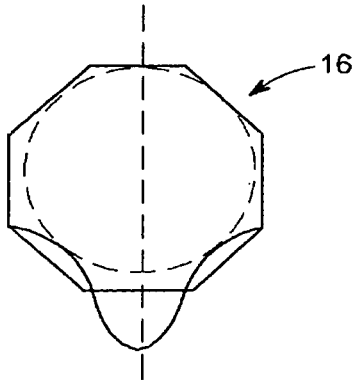
Figure 13J:
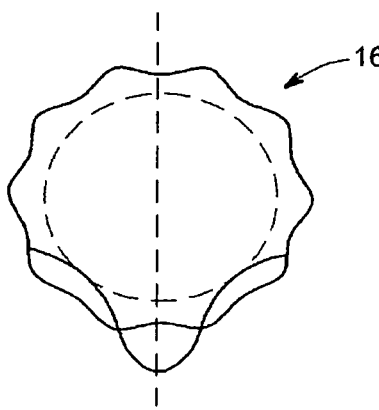

In one additional embodiment, the claw body 16 may have may have an increasing or decreasing curvature toward the claw tip profile 18, such as shown in any or all the FIGS. 13a to 13d. For example FIG. 13a illustrates claw body 16 having a conic profile. Likewise, FIGS. 13c to 13d, respectively, illustrate cylindrical, convex and parabolic profiled claw body 16. Moreover, FIGS. 13e to 13j illustrate front views of claw body 16 curvatures, such as, FIG. 13e illustrates square curvature, FIG. 13f illustrates triangular curvature, FIG. 13g illustrates square curvature having curved-corners, FIG. 13h illustrates triangular curvature having curved-corners, FIG. 13i illustrates hexagonal curvature, FIG. 13j illustrates sinusoidal curvature.

Referring to FIG. 14, an enlarged view of the digging claw member 12 is illustrated to depict enlarged views of various structures and will be described herein in conjunction to previous FIGS. 1-13i and other FIGS. 15-20. As shown, the at least one claw tip profile 18 of the digging claw member 12 having the inner profile 20 that defines a main chamber 40, and an isolation chamber 42. The inner profile 20 includes an extension member 46 extending inwardly within the claw body 16 separating the main chamber 40 from the isolation chamber 42. The isolation chamber 42 may extend at least within an inner portion 20 of the at least one claw tip profile 18.

The main chamber 40 of the claw body 16 receives a human finger or the finger of the glove 14 to be worn by the human finger. The isolation chamber 42 which is formed by the extension member 46 extends on a tip side from the main chamber 40. In one example, the isolation chamber 42 defines a smaller cross-sectional profile than the main chamber 40.

In one embodiment, the extension member 46 may include a curved surface at the tip side end forming a seat 44 for pads of the human finger or the finger of the glove 14 to be worn by the human finger, and the isolation chamber 42 extends on the tip side from the curved surface. The digging claw member 12 has an opening 1401, a tip 1403, a top exterior surface 1410, and a bottom exterior surface 1420 that has a first straight exterior section 1421 and a second curved exterior section 1422. The inner profile 20 includes a top interior surface 1411 and a bottom interior surface 1423 that includes a first straight interior section 1424, a first curved interior section 1425, a second straight interior section 1426, a second curved interior section 1427, and the extension member 46.

In one embodiment, the main chamber 40 may be sized to receive a human finger or the finger of the glove to be worn by the human finger and the extension member 46 may be sized to receive a finger nail portion of the wearer, whereas the isolation chamber 42 may be an isolated free space.

Figure 15:
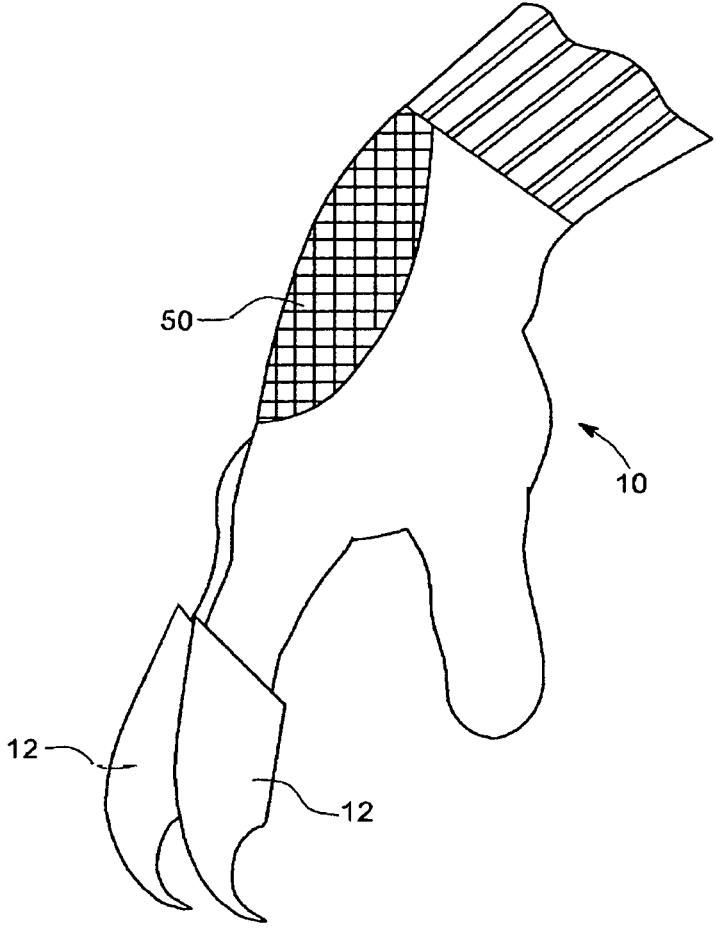
FIG. 15 illustrates a digging glove having a moisturizing liner, in accordance with various embodiments.
Figure 16:
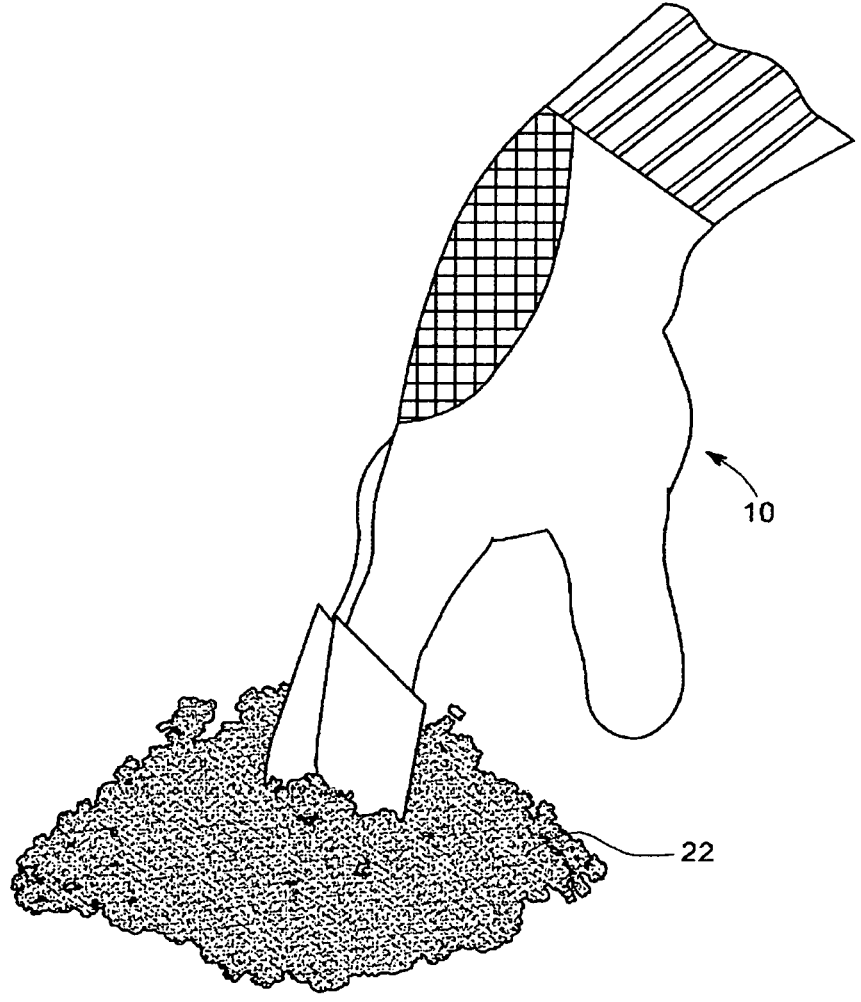
FIG. 16 illustrates the digging glove of FIG. 15 in use, in accordance with various embodiments.

Referring now to FIG. 15, the digging glove 10 may include a moisturizing liner 50 on an inner side of the glove 10. The liner 50 may release moisturizing agent after multiple uses of the glove to dig into media 22 and/or multiple washes, as shown in FIG. 16.

Figure 17A:
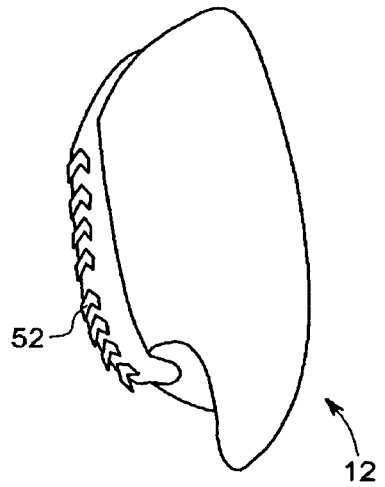
FIGS. 17a and 17b illustrate a claw of a digging glove from different views having tactile enhancement features, in accordance with various embodiments.
Figure 17B:
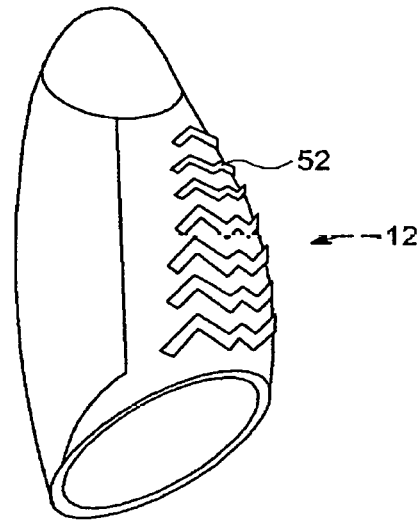

Referring now to FIG. 17, the digging glove 10 may include a tactile enhancement feature 52. As shown in FIG. 17, the tactile enhancement feature 52 may be incorporated on the digging claw member 12. The tactile enhancement feature 52 may include a tacky material projecting from an exterior surface of an underside of the claw body 16. The tactile enhancement feature 52 comprises tactile members arranged in a pattern in at least rows, columns, spots, or swirls pattern.

Figure 18:
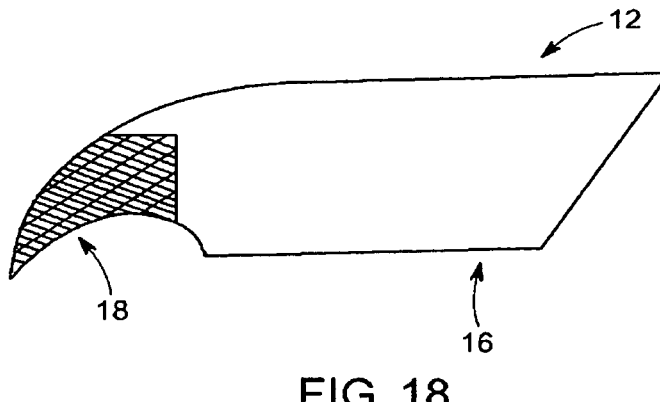
FIG. 18 is a simplified view of a claw having a removable tip.
Figure 19A:
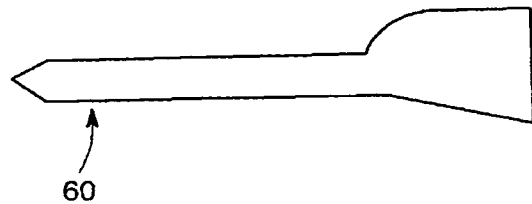
FIGS. 19a to 19c illustrate view of variations for a claw tip of a claw in accordance with various embodiments.
Figure 19B:
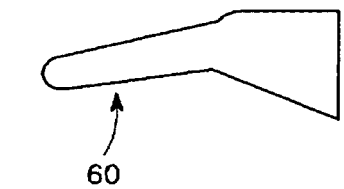
Figure 19C:
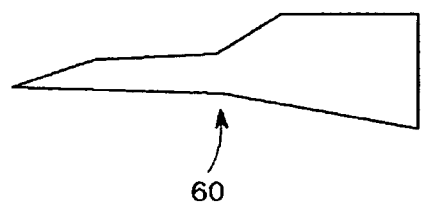

In one embodiment, as shown in FIG. 18, the claw body 16 of the digging glove 10 may include a removable a claw tip 18. In such embodiment, as shown in FIG. 19*a*-19*c*, a tool extension 60 may be provided that may be removably attached to the claw tip profile when the removable claw tip 18 is detached from the claw tip profile.

Figure 20:
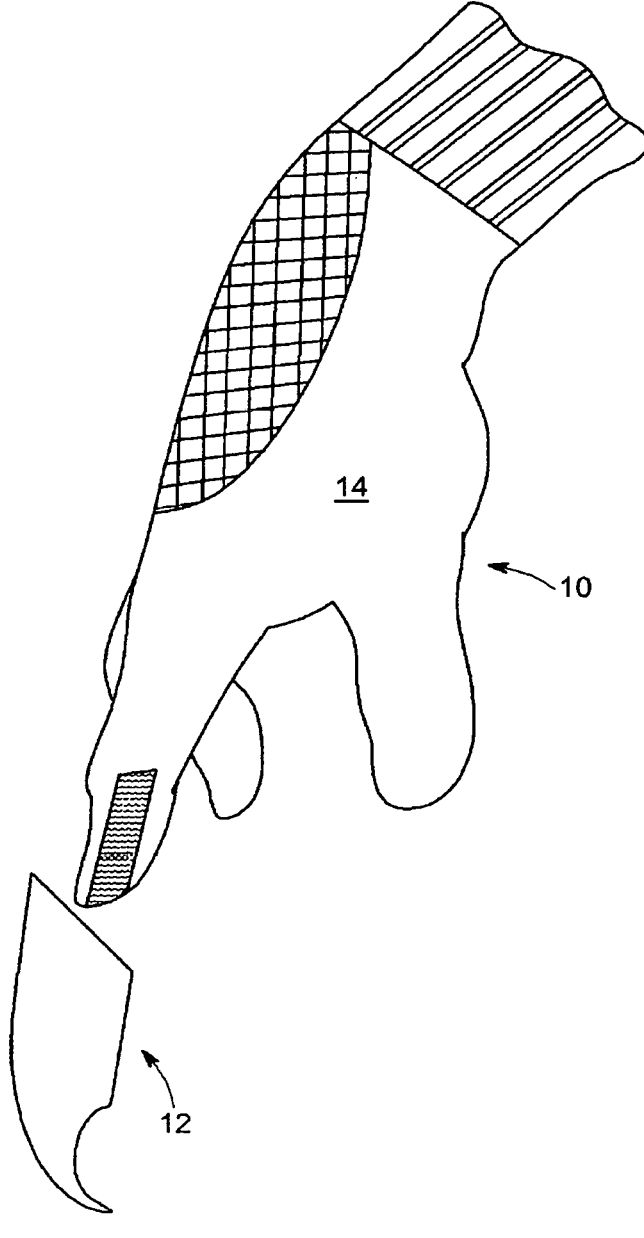
FIG. 20 illustrates a digging glove and a removable claw, in accordance with various embodiments.

The digging claw member 12 along with its claw body 16 may be seamlessly attached to the finger of the glove to fixedly secure the digging claw member to the finger of the glove, as shown in FIGS. 1 to 3, and other related FIGS. 4 to 13*j*. The claw body 16 may be seamlessly attached to the finger of the glove by encasing the fingertip or extending from the half finger portion of the glove 14. Otherwise, the digging claw member 12 along with its claw body 16 may be detachably attached to the finger of the glove 14 to removably secure the digging claw member 12 to the finger of the glove 14, as shown in FIG. 20. In one embodiment, at least one detachable connection element 70 may be provided to removably secure the digging claw member 12 and the glove 14. The detachable connection element 70 may be one of Velcro, mechanical fasteners or magnets, and the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A digging glove for a plurality of human fingers, the digging glove comprising:

a glove comprising a plurality of glove fingers each arranged to receive a human finger of the plurality of human fingers;

for each glove finger, a digging claw member secured to the glove finger, each digging claw member being made of a plastic material and comprising:

a top exterior surface that extends from an opening at a first end of the digging claw member for receiving the respective human finger to a tip of a claw-shaped end of the digging claw member;

a bottom exterior surface that extends from the opening to the tip of the claw-shaped end, the bottom exterior surface comprising a first straight exterior section and a second curved exterior section that has a single direction of curvature that extends from the first straight exterior section to the tip of the claw-shaped end and that faces away from the top exterior surface, wherein a curve of the top exterior surface and the second curved exterior section form the claw-shaped end;

an inner profile extending from the opening into the claw-shaped end, the inner profile comprising:

a top interior surface corresponding to the top exterior surface and a bottom interior surface corresponding to the bottom exterior surface;

a main chamber that includes an area within the inner profile between (i) a first straight interior section of the bottom interior surface corresponding to the first straight exterior section and (ii) a corresponding portion of the top interior surface;

a finger tip seat formed by a first curved interior section of the bottom interior surface and a second straight interior section, wherein the first curved interior section curves up from an end of the first straight interior section towards the top interior surface and connects to the second straight interior section; and an isolation chamber that includes an area within the inner profile between (i) a second curved interior section of the bottom interior surface that curves down from an end of the second straight interior section opposite an end of the first curved interior section into a straight extension member that extends into the claw-shaped end and (ii) a corresponding curved interior section of the top interior surface, wherein the second curved interior section forms an angle between the second straight interior section and the straight extension member that is greater than ninety degrees and the second curved interior section faces a same direction as the second curved exterior section; and for the claw member of at least one glove finger, a tactile enhancement feature incorporated on the bottom exterior surface of the digging claw member, the tactile enhancement feature comprising multiple rows of raised tacky material, wherein each row of raised tacky material comprises multiple raised tacky material segments that project from the tacky material and alternate in direction forming an angle between each pair of adjacent segments along the row.

2. The digging glove of claim 1, wherein the isolation chamber extends partially within the claw-shaped end and the isolation chamber is sufficiently large enough to allow the insertion of a tip of a glove within the isolation chamber.

3. The digging glove of claim 1, wherein the claw-shaped end comprises a blunt end, a sharpened end, a concave end, a convex end, a jagged end, a rounded end, a flat end or a pointed end.

4. The digging glove of claim 1, further comprising a moisturizing liner on an inner side of the glove, wherein the liner releases moisturizing agent after multiple uses of the glove and/or multiple washes.

5. The digging glove of claim 1, wherein the digging claw member is seamlessly attached to the glove finger to fixedly secure the digging claw member to the glove finger.

6. The digging glove of claim 1, further comprising at least one detachable connection element to removably secure the digging claw member to the glove, wherein the detachable connection element comprises at least one of hook and loop fasteners, mechanical fasteners, or magnets.

7. The digging glove of claim 1, wherein the claw-shaped end is removable.

8. The digging glove of claim 7, further comprising a tool extension wherein the tool extension is removably attached to the digging claw member when the claw-shaped end is detached from the digging claw member.

9. The digging glove of claim 1, further comprising a plurality of projections spread along a whole surface of the digging claw member, wherein the projections comprise at least one of thorns, teeth, spikes or fins.

10. A digging claw member for receiving a finger of a glove to be worn by a human finger, the digging claw member being made of plastic and comprising:

a top exterior surface that extends from an opening at a first end of the digging claw member for receiving the human finger to a tip of a claw-shaped end of the digging claw member;

a bottom exterior surface that extends from the opening to the tip of the claw-shaped end, the bottom exterior surface comprising a first straight exterior section and a second curved exterior section that has a single direction of curvature that extends from the first straight exterior section to the tip of the claw-shaped end and that faces away from the top exterior surface, wherein a curved section of the top exterior surface and the second curved exterior section form the claw-shaped end;

an inner profile extending from the opening into the claw-shaped end, the inner profile comprising:

a top interior surface corresponding to the top exterior surface and a bottom interior surface corresponding to the bottom exterior surface;

a main chamber that includes an area within the inner profile between (i) a first straight interior section of the bottom interior surface corresponding to the first straight exterior section and (ii) a corresponding portion of the top interior surface;

a finger tip seat formed by a first curved interior section of the bottom interior surface and a second straight interior section, wherein the first curved interior section curves up from an end of the first straight interior section towards the top interior surface and connects to the second straight interior section; and an isolation chamber that includes an area within the inner profile between (i) a second curved interior section of the bottom interior surface that curves down from an end of the second straight interior section opposite an end of the first curved interior section into a straight extension member that extends into the claw-shaped end and (ii) a corresponding curved interior section of the top interior surface, wherein the second curved interior section forms an angle between the second straight interior section and the straight extension member that is greater than ninety degrees and the second curved interior section faces a same direction as the second curved exterior section; and a tactile enhancement feature incorporated on the bottom exterior surface of the digging claw member, the tactile enhancement feature comprising multiple rows of raised tacky material, wherein each row of raised tacky material comprises multiple raised tacky material segments that project from the tacky material and alternate in direction forming an angle between each pair of adjacent segments along the row.

11. The digging glove of claim 1, wherein, for each of the one or more glove fingers, the opening at the first end of the digging claw member is adjacent to, but not overlapping, a second knuckle portion of the glove finger, the second knuckle portion of the glove finger corresponding to a second knuckle from a tip of the human finger.

12. The digging glove of claim 1, further comprising one or more spikes or fins disposed on each side of each digging claw member.

13. The digging glove of claim 1, wherein the claw-shaped end comprises a concave shape that forms the tip and an additional tip pointing in a same direction as the tip, and wherein the claw-shaped end comprises one or more additional claws that extend from each side of the claw-shaped end.

14. The digging glove of claim 1, wherein the multiple raised tacky material segments of each row of raised tacky material forms a zig zag pattern of raised tacky material.

15. The digging glove of claim 1, wherein each row of raised tacky material comprises a different length than each other row.

16. The digging glove of claim 1, wherein:

each row of raised tacky material comprises a length from a first end of the row of raised tacky material to a second end of the row of raised tacky material opposite the first end of the row of raised tacky material, the length of a first row of raised tacky material closest to the tip of the claw-shaped end has a shortest length among the multiple rows of raised tacky material, the length of a last row of raised tacky material furthest from the tip of the claw-shaped end has a longest length among the multiple rows of raised tacky material, and the length each row of raised tacky material between the first row and the last row is greater than the length of the first row and less than the length of the last row.

17. The digging glove of claim 16, wherein the last row of raised tacky material extends around a greater portion of a lateral curvature of the digging claw member than each other row of raised tacky material.

18. The digging glove of claim 1, wherein the length of each particular row of raised tacky material is less than the length of each row of raised tacky material that is further from the tip of the claw-shaped end than the particular row of raised tacky material.

19. The digging glove of claim 1, wherein the rows of tacky material are incorporated on an area of the bottom exterior surface of the digging claw member that extends from the opening to an end of the first straight exterior section such that none of the rows of raised tacky material extend into the second curved exterior section.

20. The digging glove of claim 1, wherein:

the bottom exterior surface comprises a non-tacky plastic material; and the multiple rows of raised tacky material are arranged on a tacky material that (i) is incorporated on the bottom exterior surface of the digging claw member and (ii) projects from the bottom exterior surface.

* * * * *